United States Patent

Pestel

Patent Number: 5,819,682
Date of Patent: Oct. 13, 1998

[54] ASSEMBLY OF ELEMENTS TO BE USED TO CREATE A MIXED-HULL INFLATABLE BOAT WHICH CAN BE CONVERTED INTO A CLOSED BOX

[75] Inventor: Dominique Pestel, Courbevoie, France

[73] Assignee: Zodiac International, Issy-les-Moulineaux, France

[21] Appl. No.: 850,927

[22] Filed: May 2, 1997

[30] Foreign Application Priority Data

Mar. 18, 1997 [FR] France ................................. 97 03266

[51] Int. Cl.⁶ ...................................................... B63B 7/08
[52] U.S. Cl. ........................................... 114/345; 114/353
[58] Field of Search ................................ 114/352, 354, 114/345

[56] References Cited

U.S. PATENT DOCUMENTS

| 4,597,355 | 7/1986 | Kirby ........................................ 114/345 |
| 4,811,682 | 3/1989 | Hwang et al. ........................... 114/345 |
| 5,584,260 | 12/1996 | Hemphill . | |

FOREIGN PATENT DOCUMENTS

| 2046606 | 3/1971 | France . |
| 1 957 736 | 9/1971 | Germany . |
| 33 34 845 A1 | 3/1986 | Germany . |

*Primary Examiner*—Ed. L. Swinehart
*Attorney, Agent, or Firm*—Larson & Taylor

[57] ABSTRACT

Assembly of elements forming a mixed-hull inflatable boat which can be converted into a closed box for its storage/transport, including: an elongated rigid shell (1) with a profiled extremity (2) and the other extremity closed off by a transversal bulkhead (6); an inflatable tube (7) solidly attached to the shell (1) at least along its lateral edges; and a rigid panel (9) the peripheral contour of which follows that of the peripheral edge of the shell (1) and can be fixed in a removable fashion to it; thanks to which the assembly of elements can be configured for transport/storage with the tube (7) deflated and folded away in the shell (1) and the rigid panel (9) mounted on and locked to the shell to close it and form a closed box; and a navigation configuration with the panel (9) separated from the shell (1) and the inflatable body (7) inflated under pressure forming, together with the shell (1) forming a rigid hull, a mixed-hull boat.

9 Claims, 2 Drawing Sheets

5,819,682

ASSEMBLY OF ELEMENTS TO BE USED TO CREATE A MIXED-HULL INFLATABLE BOAT WHICH CAN BE CONVERTED INTO A CLOSED BOX

BACKGROUND OF THE INVENTION

The present invention relates to improvements to convertible boats in particular with a view to facilitating their storage and especially their transportation by car. The invention more specifically relates to the improved equipment for converting a mixed-hull inflatable boat to a closed box.

Mixed-hull inflatable boats—i.e. boats that combine a rigid submerged hull, generally made of a synthetic material, and an inflatable buoyancy tube fixed to the side of said rigid submerged hull—are currently widely developed owing to their very useful characteristics of navigability.

However, unlike inflatable boats with entirely flexible hulls which, once deflated, are easily folded and transported for example in the boot of a car, mixed-hull boats present the major drawback that they are difficult to transport owing to the unitary design of the rigid submerged hull (generally including the transom): this item is difficult to transport in a standard car, and the transport of a mixed-hull boat in principle necessitates the use of a special trailer.

The main purpose of this invention is to overcome this drawback by proposing an assembly of elements constituting a mixed boat which, at least as regards relatively small boats, can be converted into a closed box of a size and configuration which allow it to be mounted and fixed to the roof of a standard car.

BRIEF SUMMARY OF THE INVENTION

An assembly of elements as proposed by the invention is essentially characterised in that it comprises:
 a rigid shell with a generally elongated shape, one end of which is profiled (front end) and the other of which is closed by an approximately transversal bulkhead (rear end),
 an inflatable body in a flexible material, of generally cylindrical shape, solidly joined to said rigid shell at least along its lateral edges, and
 a rigid panel with a peripheral contour approximately corresponding to the peripheral edge of said shell, which can be fixed to and removed from said shell,
thanks to which the assembly can be set to two different functional configurations, namely:
 a) a transport and storage configuration in which the inflatable body is deflated and folded inside the rigid shell, and the rigid panel is mounted and secured to said shell, closing it in order to form a closed box, in particular suitable to be placed on and fixed to the roof of a car in the same way as a roof luggage box for cars, and
 b) a navigation configuration, in which the rigid panel is separated from the shell and the inflatable body is inflated under pressure, said shell forming a rigid underwater hull connected to the inflated body, forming a buoyancy tube of a mixed-hull boat.

DESCRIPTION OF PREFERRED EMBODIMENTS

Generally, the inflatable body is solidly attached to the lateral and front edges of the rigid shell in the approximate shape of a U open at the rear. To facilitate the operation of folding the apparatus into the shell, it is preferable that at least the lateral edges and optionally the front edge of the rigid shell extend in one plane. According to requirements and the manner in which the boat is fitted out, the inflatable body may be solidly attached to the rigid shell in a fixed or detachable manner.

It is also preferable that the approximately transversal bulkhead envisaged at the rear of the shell is fitted as a transom allowing for example an outboard motor to be fitted and having in particular the central reinforcement required for this purpose or incorporating (solely in conjunction with the lower edge of the hull) a water jet motor (jet motor).

Finally, it is useful for the inner side of the rigid panel to be equipped with attachment means for receiving an outboard motor when in the storage position, that the closed box contains and protects the motor and optionally any other accessories (life jackets, oars, . . . ), even though the motor is always considered to be difficult to transport because of its shape, weight, smell and lack of cleanliness.

Thanks to the provisions of this invention which constitute a mixed-hull inflatable boat that is easy to transport as the rigid shell can be designed and especially sized to resemble a car roof box: this shell can therefore have a length of the order of 1.5 m to 2.5 m, corresponding to a relatively small boat, while the closed box can be attached to the roofs of any standard car currently on the market, using the same attachment means as those provided for roof luggage boxes.

The invention will be better understood on reading the detailed description which follows of a preferred implementation of the invention given as a non-limitative example. In this description reference is made to the annexed drawings in which.

Figure 2:
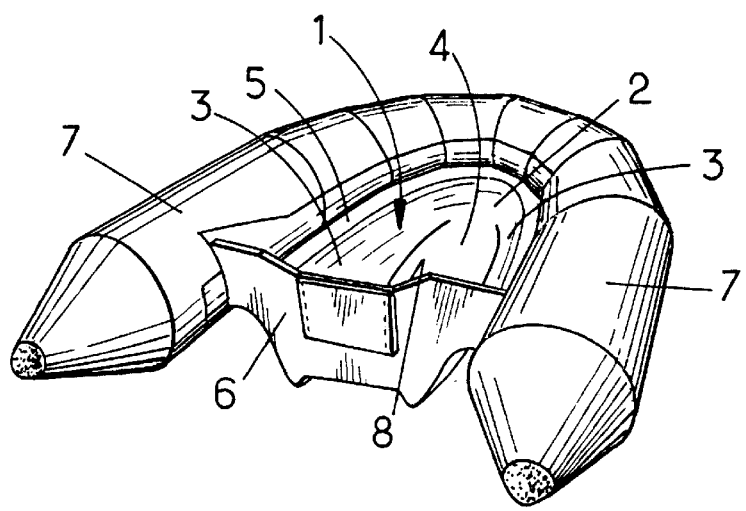
FIG. 2 is a perspective view of the same assembly of elements of the invention in its configuration as a mixed-hull inflatable boat ready for navigation.

Referring firstly to FIG. 2, the assembly of elements which are a subject of the invention comprises a rigid shell 1 of a generally elongated shape, constituted by any appropriate material, in particular of a synthetic material used to make rigid hulls for mixed-hull boats.

Figure 1:
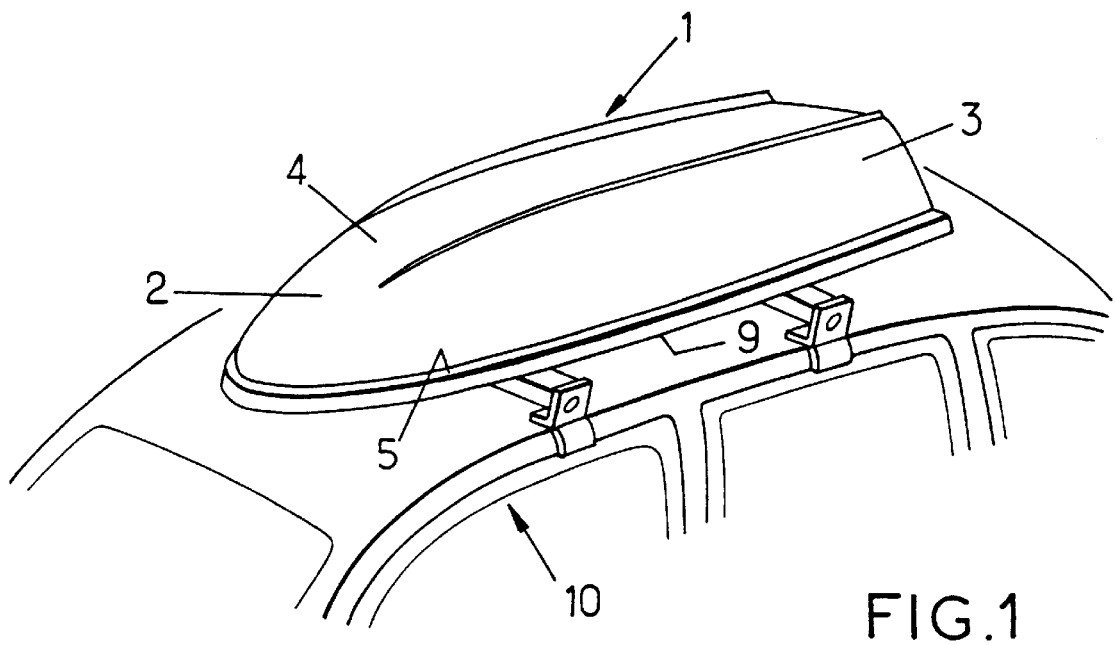
FIG. 1 is a perspective view illustrating all the elements of the invention in its configuration as a closed box installed on and secured to a car roof.

One of the ends of shell 1 is profiled both horizontally (side edges 3 progressively joining) and vertically (the bottom 4 progressively rising to the same height as the peripheral edge 5 of the shell), as can be seen better in FIG. 1 in which shell 1 is shown inverted.

The other end of shell 1 is closed by a bulkhead 6 which is approximately transversal to the shell's longitudinal axis.

The shell thus constituted is therefore suitable for forming a rigid hull the first extremity 2 of which is the front and the second extremity of which constitutes the rear together with the transversal bulkhead 6 which constitutes a transom which is suitable for supporting an outboard propulsion motor (not shown in FIGS. 1 and 2).

A generally cylindrically-shaped elongated inflatable body 7 in a flexible material is attached at least to the lateral edges of the shell 1. In the example shown in FIG. 2, the two lateral tubes extend forwards where they join, and the assembly constitutes a single inflatable buoyancy tube in the general shape of a U which is open towards the rear. The fixing of the inflatable body 7 to the edge of the shell or rigid hull 1 can be carried out by any suitable means known to a man skilled in the art, by stapling, screwing, riveting or other means; optionally a removable fixation means can also be envisaged (for example using a retaining ring/channel system according to a known technique used for traditional semi-rigid boats), although this is not essential in this case owing to the means of storage, as described below, which the present arrangement can allow.

The inflatable body 7 can be designed and configured in a similar manner to the inflatable body of a traditional mixed boat, as shown in FIG. 2.

Moreover, the transom constituted by the transversal bulkhead 6 can be arranged and configured in the same manner as the transom of a traditional inflatable boat. In the example illustrated in FIG. 2, the upper edge of the transom is cut out 8 and the central portion is reinforced in order to receive the supporting part of the outboard motor.

Figure 3:
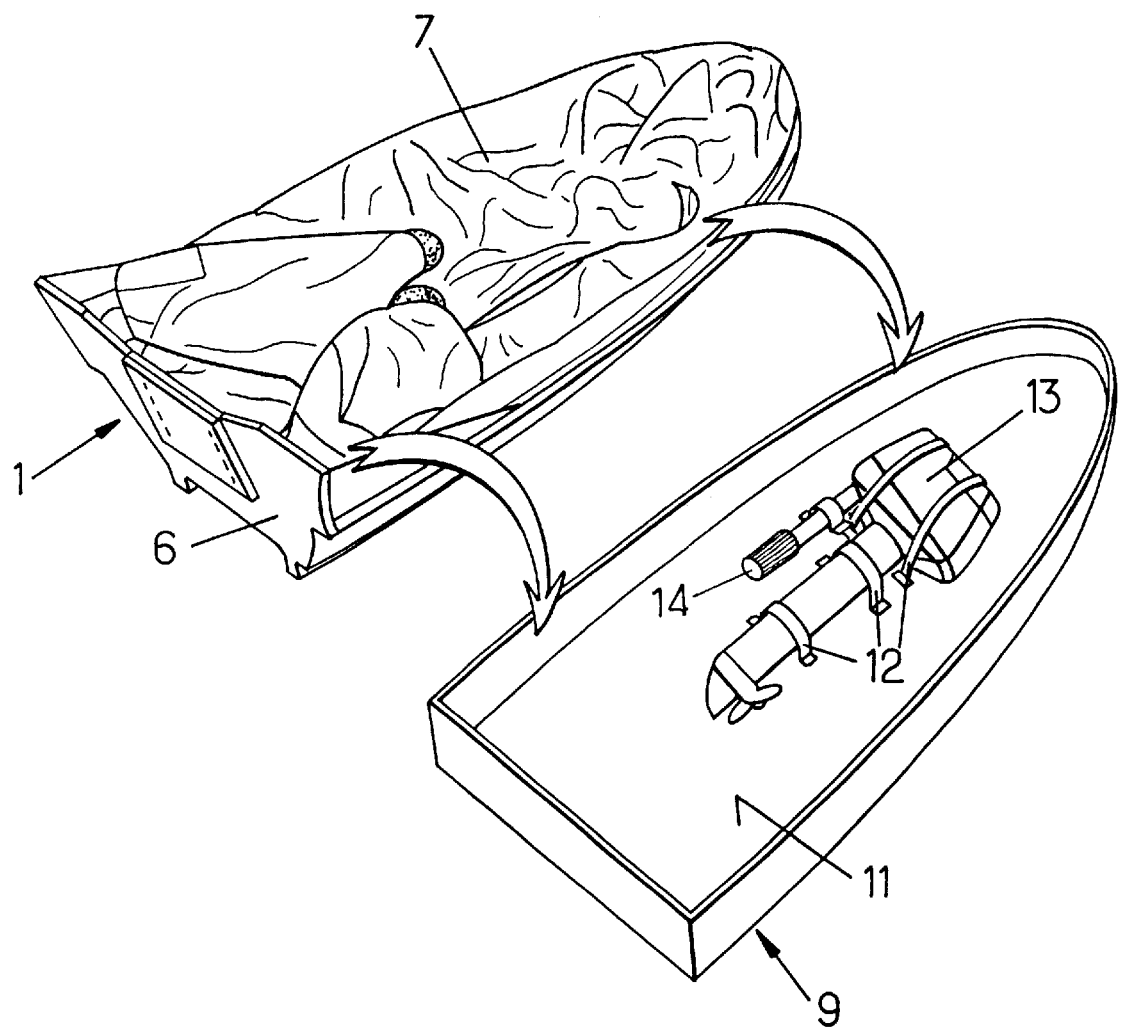
FIG. 3 is a perspective view of the assembly of elements of the invention in an intermediate arrangement, with the inflatable body emptied and folded in the shell and the cover panel removed.

Finally, as shown in FIG. 3, the assembly of elements according to the invention also includes a removable rigid panel 9, constituted by the same material as the shell 1, the peripheral contour of which corresponds at least approximately to that of the peripheral edge of shell 1.

By virtue of the arrangement which has just been described, the assembly of elements can be used in two different functional configurations.

A transport and storage configuration as illustrated in FIG. 1 can be set up, in which the inflatable body 7 is deflated and folded inside the rigid shell 1 (this configuration can be seen in FIG. 2). In order to facilitate this folding operation inside the rigid shell, it is preferable that at least the lateral edges and the front edge of the shell extend in the same plane. The rigid panel 9 is then mounted on the shell and locked to it using attachment means, preferably of rapid attachment type—not illustrated in the figures. In this position, the edge of panel 9 follows the shape of the edge of shell 1; the rear edge of panel 9 is configured so that it matches the shape of the free edge of the transom 6, either by following its contour or by covering it.

A closed box is thus created, facilitating the storage of the boat and the protection of the deflated tube and also, more advantageously, suitable for placing on and fixing to a car roof 10, as shown in FIG. 1. The shape of the hull 1, positioned with the bow 2 facing forward in the direction the car is travelling, is aerodynamically appropriate. The general shape of the box thus created is similar to that of a car roof luggage box, and it is installed in a similar fashion.

A navigation configuration can also be created, illustrated in FIG. 2, in which the rigid panel 9 is separated from shell 1, as shown in FIG. 3. The inflatable body 7 is inflated under pressure so that it fits around the shell 1 which thus constitutes a rigid hull, the assembly of the shell 1 and the inflatable body 7 forming a mixed hull.

One of the difficulties encountered in the transportation of an inflatable boat when deflated and folded is the excessive bulkiness of the outboard motor. Thanks to the implementation means according to the invention, this difficulty is overcome in that the outboard motor can be placed in the shell 1, in the middle of the deflated and folded inflatable body 7. Even more appropriately, the interior side 11 of panel 9 can be equipped with supporting and retaining means such as straps 12 suitable for fixing the outboard motor 13, after optionally folding the control handle of the latter which is attached separately.

It will be understood and as already results from the above, the invention is in no way limited to the methods of application and implementation which have been more particularly envisaged; on the contrary, it encompasses all variants.

I claim:

1. An assembly of elements forming a mixed-hull inflatable boat which can be converted to a closed box for storage and/or transport, comprising:

a rigid shell, of a generally elongated shape, of which a front extremity is profiled and the rear extremity is closed by an approximately transverse bulkhead;

an inflatable body of flexible material in the general shape of a tube, solidly joined to said rigid shell along at least one of its lateral edges; and a rigid panel having a peripheral contour approximately corresponding to the contour of the peripheral edge of said shell and which can be removably secured to said shell;

whereby the assembly can be set up in two different functional configurations, namely:

a) a transport and storage configuration in which the inflatable body is deflated and folded inside the rigid shell and the rigid panel is mounted on and secured to said shell in order to close it, thus forming a closed box suitable for mounting on a car roof; and b) a navigation configuration, in which the rigid panel is separated from the shell and the inflatable body is inflated under pressure, said shell forming a rigid hull solidly joined to the inflated body, and forming the buoyancy tube for a mixed-hull inflatable boat.

2. An assembly of elements according to claim 1, wherein the inflatable body is to lateral and front edges of the rigid shell in the approximate configuration of a U open to the rear.

3. An assembly of elements according to claim 1, wherein at least the lateral edges of the rigid shell extend approximately in one plane.

4. An assembly of elements according to claim 1, wherein the inflatable body is fixedly solidly joined to the rigid shell.

5. An assembly of elements according to claim 1, characterised in that the inflatable body (7) is removably solidly joined to the rigid shell.

6. An assembly of elements according to claim 1, wherein the approximately transverse bulkhead comprises a transom capable of supporting an outboard motor for the boat.

7. An assembly of elements according to claim 1, wherein the rigid panel further comprises means for securing an outboard motor to an interior side of said rigid panel when said assembly is in said transport and storage configuration whereby said outboard motor can be securely stored within said closed box.

8. An assembly of elements according to claim 3, wherein the lateral and front edges of the rigid shell extend approximately in said one plane.

9. An assembly of elements according to claim 1 wherein said inflatable body is joined only to said rigid shell.

* * * * *